Patented Sept. 12, 1939

2,173,058

UNITED STATES PATENT OFFICE 2,173,058

ACID SUBSTITUTED HYDROXY ALKYL-
AMINES AND PROCESS OF MAKING SAME

Wolf Kritchevsky, Chicago, Ill.

No Drawing. Application May 4, 1939,
Serial No. 271,711

30 Claims. (Cl. 260—404)

REISSUED
AUG 13 1940

My invention relates to a new class of chemical compounds and to a process for preparing such compounds.

The chief object of the invention is the protuction of new chemical compounds or reaction mixtures comprising condensation products containing such novel chemical compounds.

I have discovered that hydroxy alkylamines or alkylolamines may be condensed with higher molecular weight organic acid substances or acylating compounds such as the free acids, esters of such acids such as the monoglycerides, or halides of such acids, or any other derivative thereof which will condense with the hydroxy alkylamine or alkylolamine to split out water or acid so as to bring about a union of the two molecules. In the case of tertiary hydroxy alkylamines such as triethanolamine, for example, only esters are formed. In those cases where a non-tertiary alkylolamine as, by way of illustration, a monohydroxy alkylolamine, such as monoethanolamine, is condensed with a higher fatty acid, as shown for example in Examples 1, 2 and 9, amides and ester-amides may and usually do form, in certain cases, in predominating amounts.

Thus, for example, more specifically, I have found that when monoethanolamine or any hydroxy alkylamine is condensed with a vegetal fatty acid or a higher molecular weight organic acid, preferably a fatty acid such as stearic acid, oleic acid, linoleic acid, or a higher molecular weight fatty acid halide or monoglyceride or any ester of a higher fatty acid with a polyhydroxy alcohol, or higher molecular weight organic sulpho-chlorides or sulphonic acid derivatives of higher molecular weight organic compounds or any other reactive group, condensation products will form by the union of the monoethanolamine or the like with the higher molecular weight organic acid or derivative thereof with the splitting out of either water or an acid. The resulting condensation products are, in general, basic and form salts with any chemicals having acidic groups as, for example, hydrochloric acid, acetic acid and the like.

The condensation products of my invention are sharply distinguishable in chemical structure from and have many radically different properties than the salts or soaps resulting from the interaction of hydroxy alkylamines with higher fatty acids or the like. In the case of the formation of the salts or soaps of the hydroxy alkylamines with higher fatty acids or the like, the two compounds combine, forming an addition product. On the other hand, my condensation products result from a union of the hydroxy alkylamine with the higher fatty acid or the like whereby water or an acid, as stated, splits out.

It will be seen, therefore, that in the production of the condensation products of my invention a reaction temperature must be employed which is sufficiently high to split out water or an acid as a result of the union of the molecules of hydroxy alkylamine and higher molecular weight organic acid substance or acylating compound. Where the free acid is employed in the condensation reaction, in which case water splits out, it will be seen that a temperature of at least about 100 degrees C. should be utilized. However, for appreciable speed of reaction, it is advisable to employ more elevated temperatures and, as a general rule, a temperature range of 150 degrees C. to 175 degrees C. will serve in most cases. It will be understood, of course, that temperatures somewhat lower than the preferred range may be employed as well as higher temperatures but in no case, obviously, will the temperature be sufficiently high to cause decomposition of the reacting ingredients or the resulting product. The length of time for carrying out the reaction will likewise vary but, within the preferred temperature operating range, a few hours will usually suffice, excellent results being obtained in most cases by carrying out the reaction for from two to four hours.

For the benefit of those skilled in the art, I give hereinafter a number of representative examples which are by no means exhaustive but which I deem sufficient to teach those skilled in the art the manner in which my invention may be practiced:

1. One mol of monoethanolamine is condensed with one mol of stearic acid at 150 degrees C. to 175 degrees C. for two to four hours, while stirring.

2. One mol of monoethanolamine acetate is condensed with one mol of stearic acid at 150 degrees C. to 175 degrees C. for two to four hours, while stirring.

3. One mol of triethanolamine is condensed with one mol of linoleic acid at 150 degrees C. to 175 degrees C. for two to four hours, while stirring.

4. One mol of triethanolamine acetate is condensed with one mol of linoleic acid at 150 degrees C. to 175 degrees C. for two to four hours, while stirring.

5. One mol of benzoyl chloride is condensed with one mol of methyl diethanolamine at 150 degrees C. to 175 degrees C. for about three or four hours, while stirring.

6. One mol of abietic acid is condensed with one mol of triethanolamine at 175 degrees C. for four hours, while stirring.

7. One mol of abietic acid is condensed with one mol of butyl diethanolamine at 150 degrees C. to 175 degrees C. for three to four hours, while stirring.

8. Two mols of a higher molecular weight fatty acid chloride, such as stearic acid chloride, are condensed with one mol of triethanolamine at 150 degrees C. to 175 degrees C. for three to four hours, with stirring.

9. Two mols of a higher molecular weight fatty acid, such as stearic acid, are condensed with one mol of monoethanolamine at 150 degrees C. to 175 degrees C. for two to four hours, with stirring.

10. One mol of triethanolamine is condensed with one mol of stearic acid at 150 degrees C. to 175 degrees C. for two to four hours, with stirring.

11. One mol of palmitic acid is condensed with one mol of triethanolamine at 150 degrees C. to 175 degrees C. for two to four hours, with stirring.

12. One mol of lauric acid is condensed with one mol of triethanolamine at about 175 degrees C. for two to four hours, with stirring.

13. One mol of stearic acid is condensed with one mol of a secondary hydroxy alkylamine such as diethanolamine at 150 degrees C. to 175 degrees C. for two to four hours.

14. One mol of triethanolamine is condensed with one mol of oleic acid at about 175 degrees C. for four hours.

15. One mol of monoethanolamine is condensed with one mol of lauric acid at about 175 degrees C. for four hours.

16. One mol of monoethanolamine is condensed with one mol of oleic acid at 150 degrees C. to 175 degrees C. for two to four hours.

17. One mol of diethanolamine is condensed with one mol of lauric acid at 150 degrees C. to 175 degrees C. for two to four hours.

It is clear that the hydroxy alkylamines and the higher fatty acids or the like may be condensed in varying molal proportions. Thus, for example, one mol of the hydroxy alkylamine, such as triethanolamine, may be condensed with one, two or three mols of higher fatty acid or the like.

The hydroxy alkylamines or alkylolamines which may be employed in the condensation reaction include, in addition to those mentioned in the various examples, primary, secondary and tertiary hydroxy alkylamines or alkylolamines such as the propanolamines, butanolamines, ethanol butanolamines, diethanol butanolamines; alkyl derivatives of hydroxy alkylamines or alkylolamines, that is, hydroxy alkylamines wherein hydrogen attached to nitrogen is replaced by alkyl such as ethyl, methyl, butyl and the like; as well as mixtures of these and other hydroxy alkylamines.

The higher molecular weight organic acid substances or acylating compounds which are condensed with the hydroxy alkylamines may likewise be selected from a large group including, for example, saturated and unsaturated carboxylic, aliphatic, cycloaliphatic, fatty, and hydroaromatic acids including, for example, lauric acid, palmitic acid, myristic acid, linoleic acid, oleic acid, stearic acid, monoglycerides or other esters of said acids with polyhydroxy alcohols, abietic acid, benzoic acid as well as other derivatives of such acids as, for example, the halides such as benzoyl chloride, stearic acid chloride, and the like. Of particular usefulness are the higher molecular weight fatty acids which are derived from oils and fats of animal and vegetable origin and which may be denoted as vegetal fatty acids. It will be understood, of course, that mixtures of these as well as other higher organic acids or higher organic acid substances or acylating compounds may be employed and that such may be condensed with either substantially pure hydroxy alkylamines or mixtures thereof such as may be found, for example, in commercial products.

The condensation products of my invention function, among other things, as emulsifying and dispersing agents, as precipitants, as wetting agents and the like. Thus, for example, they may be employed in dispersions or emulsions containing water and water-immiscible materials such as oils. The condensation products have valuable properties also in the dye industry where, for example, they may be employed to disperse vat dyestuffs in aqueous media, as well as for the production of modified dye products as disclosed in Pataent No. 2,022,678.

Wherever the term "condensation product" is employed, it will be understood to cover a reaction product between an acid or acylating compound and an alkylolamine wherein water or acid or the like is split out as a result of the union of the molecules of acid or acylating compound and alkylolamine; similarly, the term "condensing" is employed to cover a process wherein water or acid or the like is split out as a result of the union of the molecules of acid or acylating compound and alkylolamine.

The term "acylating compound", as used herein, is intended to cover such compounds as free higher fatty acids, acyl halides thereof and other compounds which react with alkylolamines to introduce an acyl radical thereinto.

The present application is a continuation-in-part of my earlier application, Serial No. 476,235, filed August 18, 1930.

What I claim as new and desire to protect by Letters Patent of the United States is:

1. A chemical compound in the form of an ester comprising triethanolamine in which one "H" of the "OH" groups is substituted by a higher fatty acid radical.

2. A chemical compound in the form of an ester comprising triethanolamine in which two "H's" of the "OH" groups are substituted by a higher fatty acid radical.

3. A chemical compound in the form of an ester comprising triethanolamine in which three "H's" of the "OH" groups are substituted by a higher fatty acid radical.

4. A chemical compound in the form of an ester comprising mono-stearyl triethanolamine.

5. The process for the manufacture of dispersing agents which comprises condensing a hydroxy-alkyl amine with a higher fatty acylating compound.

6. The process for the manufacture of dispersing agents which comprises condensing a hydroxy-alkyl amine with a higher aliphatic acylating compound in a quantity insufficient for saturating both hydroxy and amino groups present in the molecule of the hydroxy-alkyl amine employed.

7. The process for the manufacture of dispersing agents which comprises condensing a hydroxy-alkyl amine with a higher aliphatic acylating compound in a quantity sufficient for saturating hydroxyl and amino groups present in the molecule of the hydroxy-alkyl amine employed.

8. The process for the manufacture of dispersing agents which comprises condensing a hydroxyl-alkyl amine, containing more than one hydroxy-alkyl group attached to a nitrogen atom, with a higher aliphatic acylating compound.

9. An ester of a hydroxy-alkyl amine and a higher aliphatic acylating compound.

10. A neutralized ester of a hydroxy-alkyl amine and a higher aliphatic acylating compound.

11. An ester-amide of a hydroxy-alkyl amine and a higher aliphatic acylating compound.

12. An ester-amide of a hydroxy-alkyl amine and a vegetal fatty acid.

13. A neutralized ester-amide of a hydroxy-alkyl amine and a higher fatty acid.

14. Dispersing agents comprising an ester of a hydroxy-alkyl amine and a higher fatty acid.

15. The process for the manufacture of dispersing agents which comprises condensing a di-hydroxy-alkyl amine with a higher aliphatic acylating compound.

16. The process for the manufacture of dispersing agents which comprises condensing a tri-hydroxy-alkyl amine with a higher aliphatic acylating compound.

17. Dispersing agents comprising a condensation product of a di-hydroxy-alkyl amine and a higher aliphatic acylating compound.

18. Dispersing agents comprising an ester of a tri-hydroxy-alkyl amine with a higher aliphatic acylating compound.

19. Dispersing agents comprising a condensation product of a hydroxy-ethyl amine and a higher fatty acylating compound.

20. An ester of an aliphatic hydroxy-ethyl mono-amine with a vegetal fatty acid.

21. An ester of a tri-hydroxy-ethyl amine with a vegetal fatty acid.

22. Condensation products of alkylolamines with higher fatty acids.

23. Condensation products of higher fatty acids with a member selected from the group consisting of mono-ethanolamine, diethanolamine, triethanolamine and mixtures thereof.

24. Condensation products of higher aliphatic acids and alkylolamines wherein hydrogen directly attached to the nitrogen of the alkylolamines is replaced by alkyl.

25. Condensation products of higher aliphatic acids and alkylolamines wherein hydrogen directly attached to the nitrogen of the alkylolamines is replaced by methyl.

26. Condensation products of higher fatty acids and alkylolamines wherein hydrogen directly attached to the nitrogen of the alkylolamines is replaced by alkyl.

27. Condensation products of higher fatty acids and alkylolamines wherein hydrogen directly attached to the nitrogen of the alkylolamines is replaced by methyl.

28. The process for the manufacture of dispersing agents which comprises condensing a hydroxy-alkyl amine with a higher aliphatic acylating compound.

29. A condensation product of a hydroxy-alkyl amine and a higher aliphatic acylating compound.

30. Dispersing agents comprising an amide of a mono-hydroxy-alkyl amine and a higher aliphatic acylating compound.

WOLF KRITCHEVSKY.